US008714076B2

(12) United States Patent
Uspenski et al.

(10) Patent No.: US 8,714,076 B2
(45) Date of Patent: May 6, 2014

(54) TEA STEEPING ASSEMBLY

(76) Inventors: Maria Uspenski, Boulder, CO (US);
Alexis Uspenski, Rock Creek, OH (US)

(*) Notice: Subject to any disclaimer, the term of this patent is extended or adjusted under 35 U.S.C. 154(b) by 396 days.

(21) Appl. No.: 13/065,825

(22) Filed: Mar. 29, 2011

(65) Prior Publication Data

US 2012/0174795 A1   Jul. 12, 2012

Related U.S. Application Data

(60) Provisional application No. 61/341,373, filed on Mar. 29, 2010.

(51) Int. Cl.
*A47G 19/14* (2006.01)
*B65B 55/00* (2006.01)

(52) U.S. Cl.
USPC ................................ 99/317; 220/525; 99/323

(58) Field of Classification Search
USPC ................. 99/320, 319, 317, 323, 318, 279, 99/321–322
See application file for complete search history.

(56) References Cited

U.S. PATENT DOCUMENTS 240,402 A * 4/1881 Gee .................................. 99/322

* cited by examiner

*Primary Examiner* — Jianying Atkisson
(74) *Attorney, Agent, or Firm* — Ramon L. Pizarro; Edwin H. Crabtree

(57) ABSTRACT

A system and process for steeping tea in a vessel is disclosed. The present invention incorporates the use of an infusing filter seated on or within a vessel and a lid or retaining mechanism to steep tea in water. The vessel has an retaining ledge that supports a mating infuser placed inside. The infuser seats in a stationery position on the mating ledge inside the vessel, offset from the center of the vessel, to allow for stirring, pouring or drinking of the resulting beverage without introducing the infusible material into the resulting steeped beverage product. The infuser comprises a filter element that holds the infusible material and allows contact with the water. The infusing filter is retained in its seated position in the cup, ether by a lid or positive locking mechanism that allows for the safe and convenient portage of the tea steeping assembly. The tea steeping assembly introduces a system that has the ability to produce a beverage product in a process that is entirely biodegradable and compostable.

6 Claims, 5 Drawing Sheets

SECTION A-A
SCALE 1 : 2

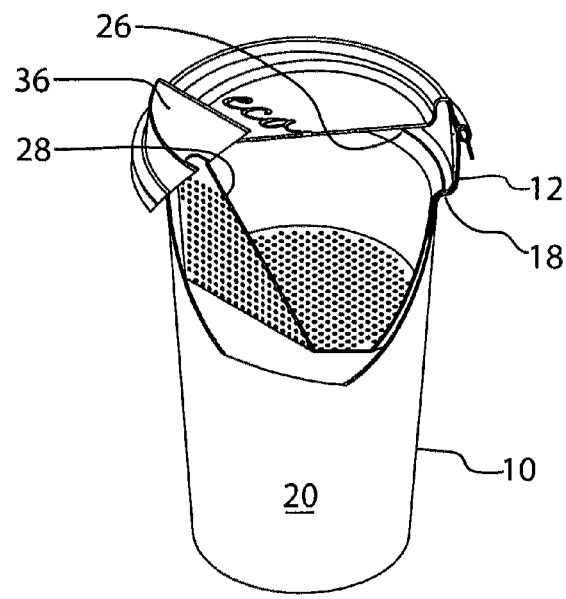
FIG. 1
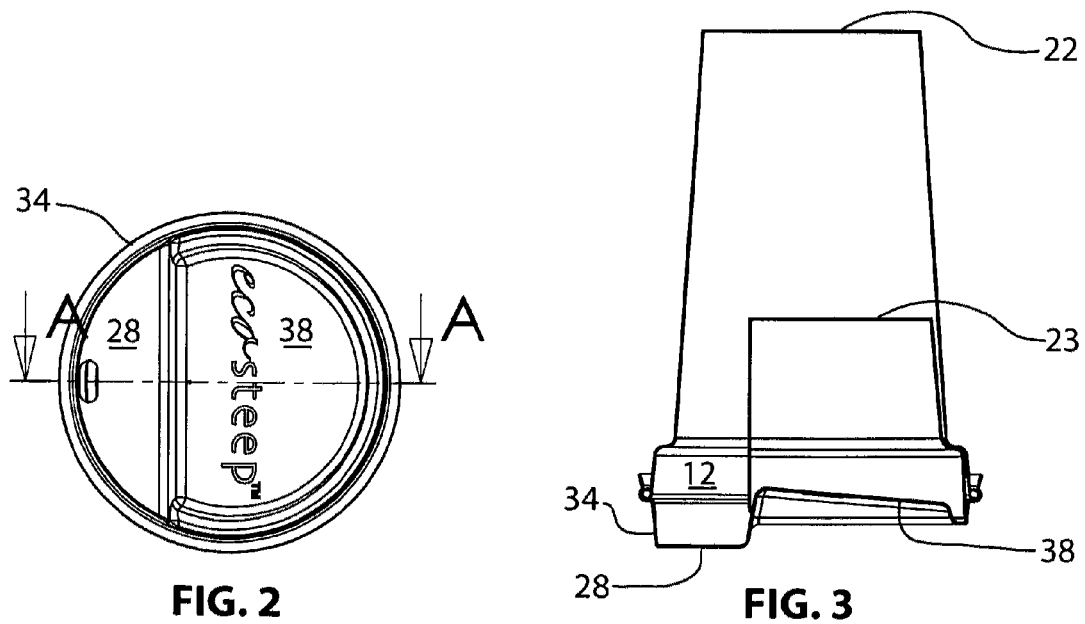
FIG. 2
FIG. 3
SECTION A-A
SCALE 1 : 2

SECTION A-A
SCALE 1 : 1

TEA STEEPING ASSEMBLY

REFERENCE TO RELATED APPLICATIONS

This application claims the benefit of my provisional application having Ser. No. 61/341,373, filed Mar. 29, 2010.

BACKGROUND

1. Field of Invention

The present invention generally relates to the field of adding flavor to a liquid, and more particularly to a system and a process for steeping tea. The system is comprised of a vessel, an infusing filter, and a retention lid/mechanism. The invention at hand imparts tea flavor to water, producing a product free of infusible material. The primary intended application is for use in commercial foodservice preparation of tea.

2. Description of the Related Arts

Increased awareness of the health benefits and superior flavor of full leaf tea, as well as economic pressure to provide better value products are driving the demand for loose tea in cafes and restaurants. Conventional loose leaf tea preparation methods in foodservice normally require hand bagging of the loose teas, and securing the hand-packed teabag to the cup or lid with a stick, or by securing one end of the teabag between the lid and the cup. This method is time-consuming and awkward in its preparation. Alternatively, tea is prepared in foodservice with concentrate or tea bags, adding cost and non-compostable waste to the end product. The invention at hand uses an infuser seated within an offset position in a teacup, pitcher or teapot, with a lid or latching mechanism with positive retention to secure the infuser in place and allow for the simple and rapid preparation and safe portability of a steeped beverage. Loose-leaf tea is a significantly better value than bagged tea, and is 100% biodegradable and compostable. The tea steeping assembly provides improved ease of use, safety, value, convenience, and less waste. It is preferably a low cost, biodegradable unit, thus rendering the resulting cup of tea making process "zero-waste".

U.S. Pat. No. 5,952,028 discloses a disposable system for making hot infused beverages using a porous filter where the filter is detachably coupled to the edge of the beverage container. This invention provides ample area for effective steeping of the infusible material. However, the subject disposable system is sufficiently complex in the number, geometry, required precision and manufacturability of its components to outweigh its economic and environmental benefits when compared to a teabag steeping solution in foodservice. In addition, this system makes the introduction and stirring of additives to the beverage product difficult. Similarly, U.S. Pat. No. 5,913,964[2] discloses a disposable system with a lid-integrated central infusing unit. However, the infusing filter in this invention is sufficiently complex in its geometry and its integration with the lid makes stirring of additives to the beverage product impossible without removal of the infusing unit. Such a safety limitation would likely make the use of this system impossible in foodservice. In addition, this invention would likely be made from an injection-molded plastic, thus degrading the quality of the resulting beverage product.

SUMMARY

A first aspect of the present invention generally relates to a system comprised of a steeping vessel, which in a preferred embodiment includes a stackable cup, and an infusing filter that cooperates with the cup to retain the tea material inside the cup while seeping in water.

In the first preferred embodiment of this aspect generally an infusing filter fits inside and seats on an inside diameter ledge of a steeping vessel. The infusing filter is unmoving in this configuration, mated to the vessel's interior ledge, in a position offset from center inside the steeping vessel.

A second aspect of the present invention generally relates to a retention lid or mechanism, and its cooperation with the filter and the cup to retain the infusing filter at a desired location within the cup.

In the first preferred embodiment of this second aspect a retention mechanism, comprised of a lid, secures an infusing filter placed atop a retaining ledge inside a steeping vessel, keeping it stationary.

In the second preferred embodiment of this second aspect a retention mechanism, comprised of a lid securing an infusing filter placed inside a steeping vessel, isolates the solid infusing material from the steeped beverage product.

The method of preparing a steeped beverage includes the following steps:

1. The infusing filter is placed inside the steeping vessel onto the retaining ledge.
2. Infusible material is introduced into the infusing filter.
3. The steeping vessel is filled with desired temperature liquid, thus covering all the infusible material.
4. The lid is placed over the steeping vessel and infusing filter combination, thus retaining the infusing filter in a fixed position, independent of the orientation of the steeping vessel with respect to the horizontal.
5. The infusible material is allowed to steep for the appropriate length of time to produce the desired beverage product.
6. The finished beverage is delivered out of the steeping vessel at the side opposite where the infusing filter is seated, free of infusible material.

The above-described system of steeping vessel, infusing filter and retaining lid offers several advantages over the current state of the art for take-away loose leaf tea methods. One advantage is that it offers a faster process. A second advantage is that it offers a safer system and process, since the filter remains fixed inside the steeping vessel. A third, and related advantage is that this system produces no spillage, unlike systems where teabags or filters are to be removed from the steeping vessel. The Steeping Tea Cup system also offers economic, quality and environmental advantages over take-away tea bags. Loose tea in bulk is a better value per serving than pre-packaged tea bags. The quality of resulting beverage product is more easily controlled when the portion size of infusible material can be adjusted. When made in its preferred embodiment of biodegradable paper material, the Steeping Tea Cup system offers a take-away product that is 100% biodegradable and compostable, with no waste from teabags or inserts.

There have thus been outlined features of the invention in order that the detailed description thereof that follows may be better understood, and in order that the present contribution to the art may be better appreciated. There are, of course, additional features of the invention that will form the subject matter of the claims appended hereto. In this respect, before explaining at least one embodiment of the invention in detail, it is to be understood that the invention is not limited in its application to the details of construction and to the arrangements of the components set forth above or in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DESCRIPTION OF THE DRAWINGS

FIG. 1 shows a cross sectional perspective of the first and second embodiments of the second aspect of the invention, with the lid isolating the infusing material from the finished beverage products and retaining the infusing filter stationery, seated inside the steeping vessel.

FIG. 2 shows a top view of the same embodiment of the invention illustrated in FIG. 1.

FIG. 3 shows a side cross-section view of the same embodiment of the invention illustrated in FIG. 1.

DETAILED DESCRIPTION OF PREFERRED EMBODIMENTS

Figure 4:
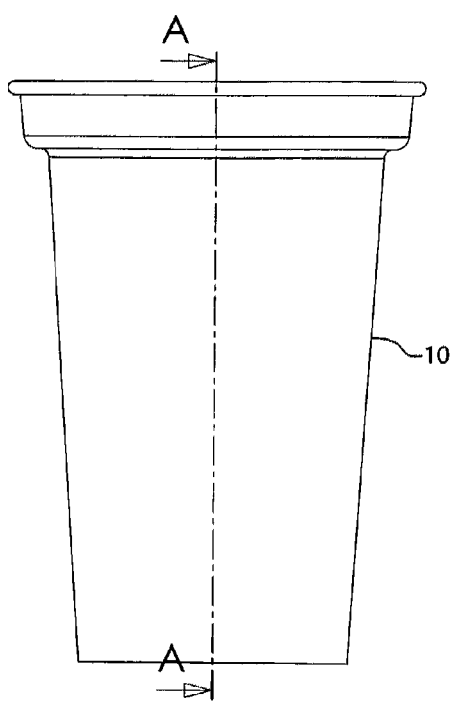
FIG. 4 shows a side view of the vessel in FIG. 1.
Figure 5:
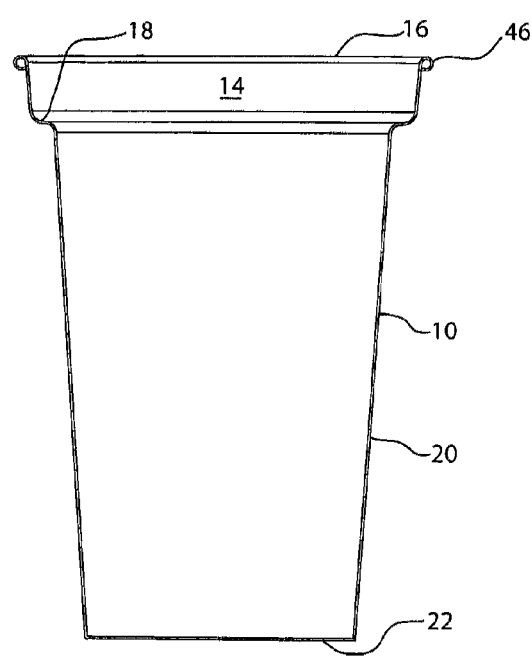
FIG. 5 shows a cross sectional view of the vessel in FIG. 1.

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Attention is now directed to FIG. 1, where a highly preferred example of a system 11 for creating a tea steeping assembly from stackable components has been illustrated. This embodiment of the system 11 is shown as being used with a vessel 10, which is contemplated as being a stackable cup having a generally truncated-conical shape. The preferred example of this vessel is stackable cup made of material that may be composted ("compostable"), and includes the drinking cup made and sold as item number BHC-16-WA by Eco-Products, Inc., of Boulder, Colo.

The vessel 10 includes a brim 12 that includes brim sides 14 that terminate in a vessel opening 16. The brim further having a brim ledge 18 or lip. The vessel 10 also includes vessel sides 20, and a bottom 22. The vessel sides 20 extend between the brim ledge 18 and the bottom 22. Additionally, the vessel includes interior sides 25, which is follows the shape of the vessel sides 20, and is thus also generally conical. The conical shape allows stacking of the cups, in a manner that is well known in the art.

Figure 6:
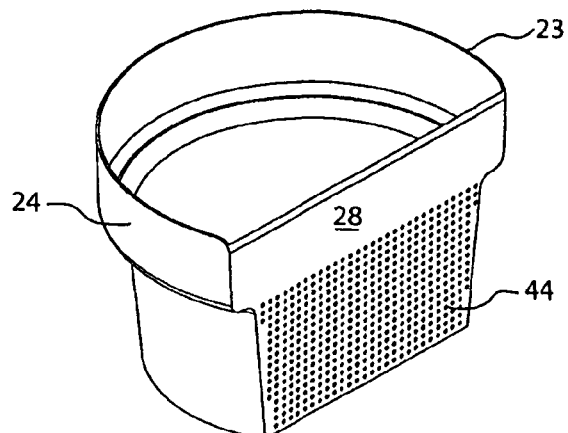
FIG. 6 shows an expanded perspective view of the infusing filter in FIG. 1, removed for ease of illustration.
Figure 7:
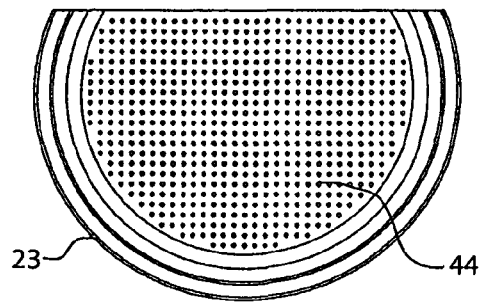
FIG. 7 shows a top view of the infusing filter in FIG. 6.
Figure 8:
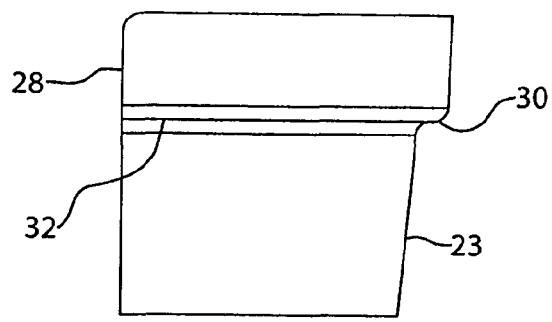
FIG. 8 shows a side view of the infusing filter in FIG. 6.
Figure 9:
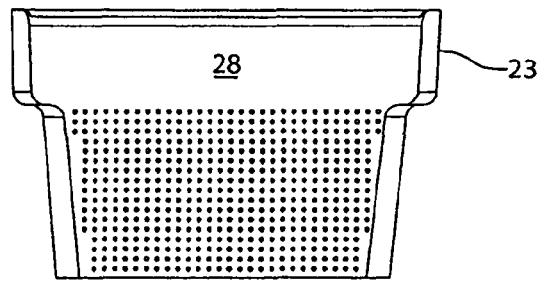
FIG. 9 shows a side view of the infusing filter in FIG. 8, orthogonal to the view shown in FIG. 8.

As illustrated in FIG. 3, the vessel 10 cooperates with an infusing filter 24 that has been adapted for extending into the steeping vessel 10. Turning to FIGS. 6-9 it will be understood that the infusing filter 24 has an external filter perimeter surface 23 that is generally conical in shape, and has adapted for nesting against the interior sides 25 of the vessel 10. The external filter perimeter surface 23 is semi-circular, and terminates at a filter wall 28, which creates a generally crescent shape from the filter perimeter surface 23 and the filter wall 23. The conical shape of the filter external filter perimeter surface 23 allows the infusing filter 24 to be inserted into the steeping vessel 10, where it will nest against the interior sides 25 of the steeping vessel 10, much like stackable cups.

Figure 10:
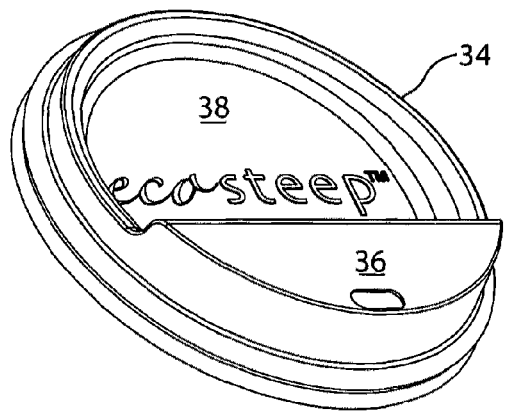
FIG. 10 shows an expanded perspective view of the lid in FIG. 1, removed for ease of illustration.
Figure 11:
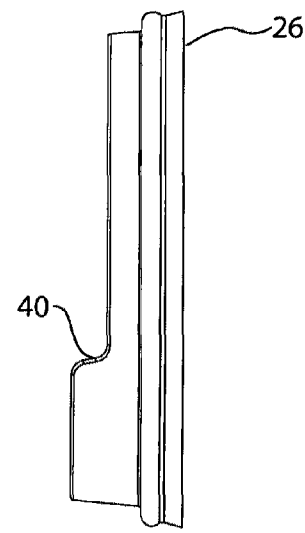
FIG. 11 shows a side view of the lid in FIG. 10.
Figure 12:
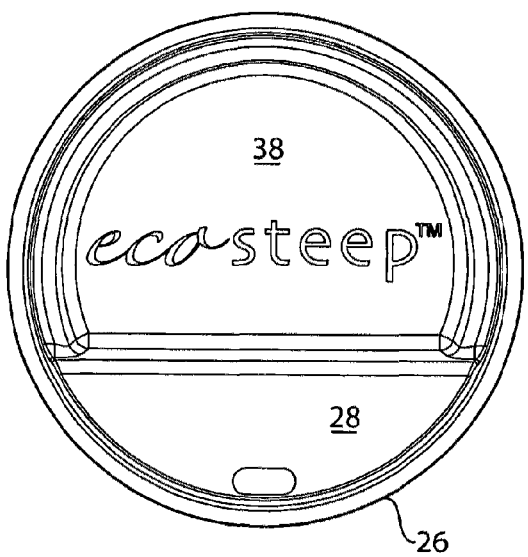
FIG. 12 shows a top view of the lid in FIG. 10.
Figure 13:
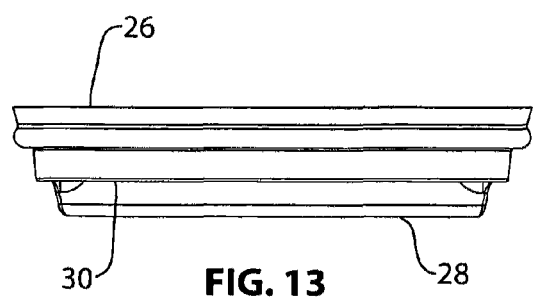
FIG. 13 shows a side view of the lid in FIG. 10, orthogonal to the view shown in FIG. 11.
Figure 14:
FIG. 14 illustrates the assembled cup with the lid while retaining the infusing filter inside.
Figure 15:
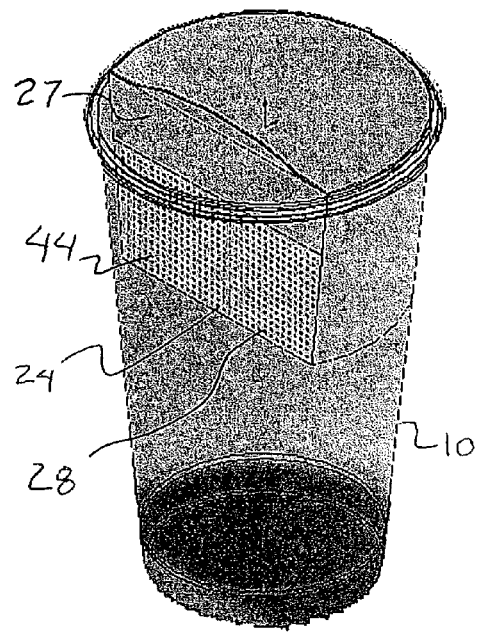
FIG. 15 illustrates the positioning of the infusing filter inside the vessel (cup), and illustrates that the perimeter of the infusing filter extends more than 180 degrees along the inside of a section of the vessel, and thus the infusing filter cooperates with the perimeter and the conical shape of the cup to retain the infusing filter at a desired location within the vessel, obviating the need for the brim ledge.
Figure 16:
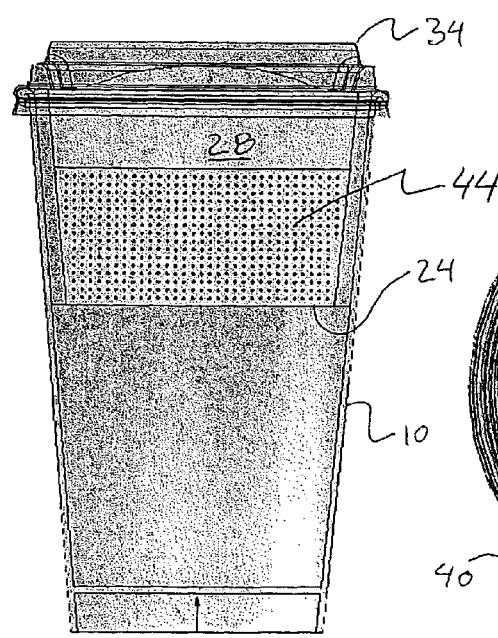
FIG. 16 illustrates the nesting of the infusing filter and the lid on to the vessel to retain the infusing filter at the desired position in the vessel.
Figure 17:
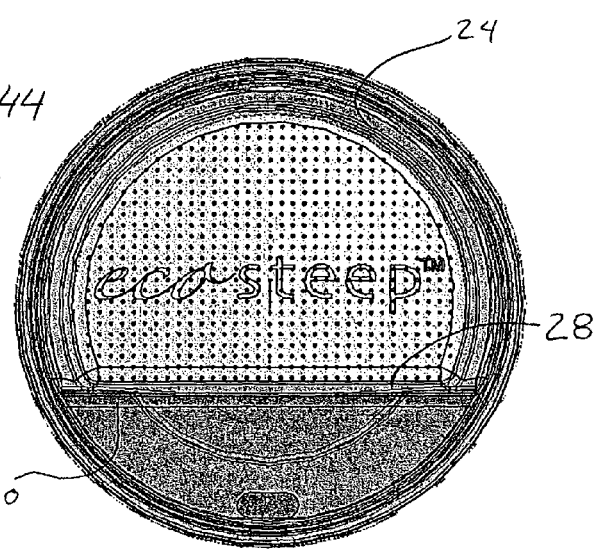
FIG. 17 illustrates the nesting of the infusing filter and the lid on to the vessel to retain the infusing filter at the desired position in the vessel, and also illustrates that the arrangement maintains a sipping path between the infusing filter and the vessel.

The steeping vessel is designed for use with a lid 34, illustrated in FIGS. 10-13, that includes a sipping region 36 and a retaining region 38. The retaining region 38 extends away from the sipping region 36 and includes a lid wall 40 that that is adapted for following a portion 27 of the filter wall 28 when the lid 34 is positioned on top of the vessel opening 16. Thus, it will be understood that inserting the infusing filter 24 into the vessel 10 will cause the infusing filter 24 to nest within the upper portion of the vessel 10, which allows the positioning of the lid 34 onto the vessel 10 with the lid wall 40 cooperating with the filter wall 28 to maintain the infusing filter 24 and the lid 14 in a generally fixed position. That is, when the lid 34 is positioned onto the vessel 10, with the infusing filter 24 inside the vessel 10, the cooperation of the filter wall 28 and the lid wall 40 will keep the infusing filter 24 away from the sipping region 36 of the lid 34, which will allow a user to sip liquid from the vessel 10 without encountering loose tea leaves retained within the infusing filter 24.

Still further, it is contemplated that the lid 34 will also include a resilient edge 26 that is adapted for engaging the vessel brim 12 so that the lid retains the infusing filter 24 within the vessel 10 while maintaining the relationship of the infusing filter 24.

FIGS. 1 and 6-9 also show that the infusing filter 24 includes at least one area of permeable material 44. The area of permeable material should be retained at a slight distance from the interior sides 25 of the vessel 10 when the infusing filter 24 is nested within the vessel 10. This spacing may be accomplished by simply retaining the permeable material 44 at a distance inwardly from the external filter perimeter surface 23, or by making the permeable material as a flat surface, which will cause the permeable material to extend across section of the filter perimeter surface as a chord. The separation of the permeable material 44 and the interior sides 25 of the vessel 10 is done to facilitate the flow of fluid into and out of the infusing filter 24.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A tea steeping assembly for use with a stackable cup, the stackable cup that has sides that are generally conical in shape to allow telescopic stacking of the stackable cups, the stackable cups further having a circular brim that is adapted for accepting a lid that engages the brim, the tea seeping assembly comprising:
   an infusing filter adapted for extending into the stackable cup, the infusing filter having a filter perimeter that is adapted for extending more than 180 degrees along a portion of the brim perimeter and terminates in a filter wall, the filter wall extending between the filter perimeter in a chord-like manner, the infusing filter further having an area of permeable material between the filter perimeter and the filter wall; and
   a lid having a sipping region, a retaining region, and a lid wall, the lid wall extends from the lid and is positioned between the sipping region and the retaining region of the lid, the lid wall being adapted for extending below the filter perimeter and along the filter wall, the lid further having a resilient edge that extends around the sipping region, the retaining region, and the lid wall, the resilient edge being adapted for engaging the brim of the cup, so that the wall of the lid retains the infusing filter in a fixed relationship relative to the sipping region of the lid while retaining the infusing filter within the brim wall of the vessel.

2. A tea steeping assembly according to claim 1 wherein the retaining region of the lid fits within the filter perimeter when the flange.

3. A tea steeping assembly according to claim 2 wherein the retaining region of the lid is impermeable and is in a fixed relationship to the retaining region of the lid.

4. A tea steeping assembly system comprising:
   at least one stackable cup with sides that are generally conical in shape, the conical shape of the cup being adapted for allowing telescopic stacking of the cup with other cups, the stackable cup further having a circular brim that is adapted for accepting a lid that engages the brim;
   an infusing filter adapted for extending into the stackable cup, the infusing filter having a filter perimeter that is adapted for extending more than 180 degrees along a portion of the brim perimeter and terminates in a filter wall, the filter wall extending between the filter perimeter in a chord-like manner, the infusing filter further having an area of permeable material between the filter perimeter and the filter wall; and
   a lid having a sipping region, a retaining region, and a lid wall, the lid wall extends from the lid and is positioned between the sipping region and the retaining region of the lid, the lid wall being adapted for extending below the filter perimeter and along the filter wall, the lid further having a resilient edge that extends around the sipping region, the retaining region, and the lid wall, the resilient edge being adapted for engaging the brim of the cup, so that the wall of the lid retains the infusing filter in a fixed relationship relative to the sipping region of the lid while retaining the infusing filter within the brim wall of the vessel.

5. A tea steeping assembly according to claim 4 wherein the retaining region of the lid fits within the filter perimeter when the flange.

6. A tea steeping assembly according to claim 5 wherein the retaining region of the lid is impermeable and is in a fixed relationship to the retaining region of the lid.

* * * * *